F. A. RUFF.
EMERGENCY ANTISKIDDING DEVICE.
APPLICATION FILED DEC. 3, 1909.
971,312.
Patented Sept. 27, 1910.
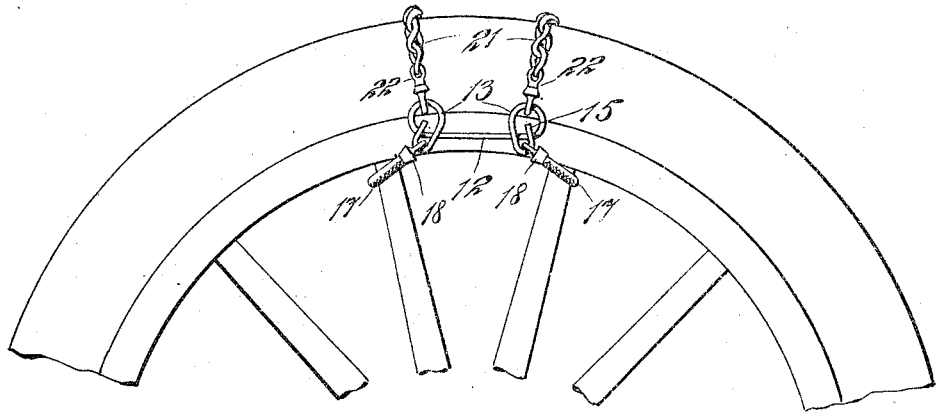
Fig. 1.
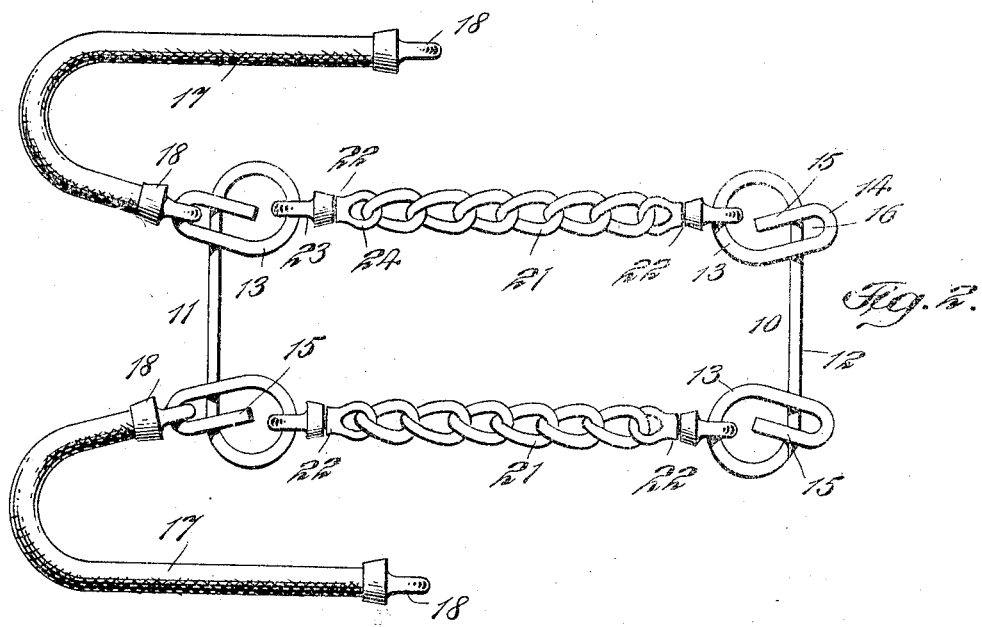
Fig. 2.
WITNESSES:
Fig. 3.
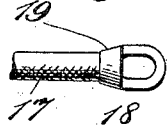
INVENTOR
Frederick A. Ruff
BY
J. A. E. Criswell
ATTORNEY

UNITED STATES PATENT OFFICE.

FREDERICK A. RUFF, OF NEWARK, NEW JERSEY.

EMERGENCY ANTISKIDDING DEVICE.

971,312.  Specification of Letters Patent.  Patented Sept. 27, 1910.

Application filed December 3, 1909. Serial No. 531,181.

*To all whom it may concern:*

Be it known that I, FREDERICK A. RUFF, a citizen of the United States, and a resident of Newark, county of Essex, and State of New Jersey, have invented certain new and useful Improvements in Emergency Antiskidding Devices, of which the following is a full, clear, and exact description.

This invention relates more particularly to a device which is adapted to be quickly placed on or detached from the wheels of automobiles.

The primary object of the invention is to provide a simple and efficient device having one or more tread elements which are adapted to be passed about the casing of pneumatic tires of automobiles in case the wheel or wheels of the automobile should strike a slippery or muddy place tending to cause the wheel tires to slip or skid, which device is so constructed that it may be quickly attached to or detached from the wheel, and which will serve as an effective means to cause the wheel to quickly grip and hold to the ground, thus avoiding the necessity of having a complete armor on the wheel or wheels.

Another object of the invention is to provide a simple and efficient device which may be cheaply and readily made, and which is adapted to be passed about the tire and around the wheel spokes so as to hold the device against unusual movement.

A further object of the invention is to provide a device having simple and efficient attaching elements for the tread members or chains.

With these and other objects in view, the invention will be hereinafter more particularly described with reference to the accompanying drawings, which form a part of this specification, and will then be pointed out in the claims at the end of the description.

In the drawings, Figure 1 is an elevation of one form of device embodying my invention, showing how the same may be applied to the wheel of an automobile. Fig. 2 is a detail plan view of the device; and Fig. 3 is a fragmentary view of one end of the flexible holding member.

The device may have two attaching members 10 and 11 which are adapted to fit on opposite sides of the wheel, and each attaching member may be made of heavy steel wire and may comprise a body portion 12 which is bent to form an eye or loop portion 13 at each end, and said loop portion terminates in a hooked portion 14, the end 15 of which lies closely against the body portion 12 requiring the said end 15 to be sprung from said portion 12 or the looped portion 13 before another element can be slipped over said end into an opening 16 formed by said hooked portion.

A plurality of flexible holding or connecting members 17 formed of heavy cord or otherwise each have a coupling member 18 at each end. This coupling member 18 has a socket portion 19 and a loop portion 20 which is adapted to be passed over the end 15 and by the body 12 so as to be properly and detachably held in the opening 16 of the hooked portion 14. One of the coupling members 18 of each flexible member 17 is adapted to be held to the attaching member 11, and the other end may be passed about the spokes, or about the tire or wheel in any other desired way, and be fastened to the hooked portions of the attaching member 10 thus holding the said attaching members on opposite sides of the wheel as shown in Fig. 1.

The loop portions 13 extend outward when the device is in use, and to the loop portions are held the ends of the tread members 21. As shown the tread members or elements are in the form of chains of the kind usually employed in anti-skidding devices, and each end of each tread chain is provided with an attaching device 22. This coupling or attaching device may comprise two members 23 and 24, both of which may be held to have a relative movement in a rotary direction with relation to each other so as to form a swivel connection, and said attaching devices 22 may be so arranged as to be permanently held to the attaching members 10 or be detachably held thereto as desired.

From the foregoing it will be seen that a simple and efficient device is provided whereby the said device may be quickly and easily attached about the tire of an automobile wheel or other rotary element to prevent the same skidding or slipping; that more than one device may be used in connection with each wheel if desired; that said device is easily constructed and has many advantages for emergency and temporary purposes over the usual armor or anti-skidding device; that said device is particularly adapted for temporary use; and that said device may be constructed to hold one or more tread elements.

Having thus described my invention, I claim as new and desire to secure by Letters Patent:—

1. A device of the character described, comprising two attaching members provided with looped portions and having hooked portions extending across said loops, a tread member connected to the attaching member at the loops and means connecting the hooked portions whereby the tread member may be held about the tire of a wheel.

2. A device of the character described, comprising two attaching members provided with looped portions and having hooked portions forming a continuation of said looped portions and lying in substantially the same plane as the looped portions, a tread member connected to the attaching member at the loops and means connecting the hooked portions whereby the tread member may be held about the tire of a wheel.

This specification signed and witnessed this 1st day of December A. D. 1909.

FREDERICK A. RUFF.

Witnesses:
 W. A. TOWNER, Jr.,
 M. DIMPSAUPT.